C. E. SCHINDLER.
BORDER CALCULATOR.
APPLICATION FILED SEPT. 4, 1907.

904,456.

Patented Nov. 17, 1908.

3 SHEETS—SHEET 1.

Witnesses

Inventor
Charles E. Schindler
By Victor J. Evans
Attorney

C. E. SCHINDLER.
BORDER CALCULATOR.
APPLICATION FILED SEPT. 4, 1907.

904,456.

Patented Nov. 17, 1908.

3 SHEETS—SHEET 2.

Witnesses

Inventor
Charles E. Schindler
By Victor J. Evans
Attorney

C. E. SCHINDLER.
BORDER CALCULATOR.
APPLICATION FILED SEPT. 4, 1907.
904,456.
Patented Nov. 17, 1908.
3 SHEETS—SHEET 3.
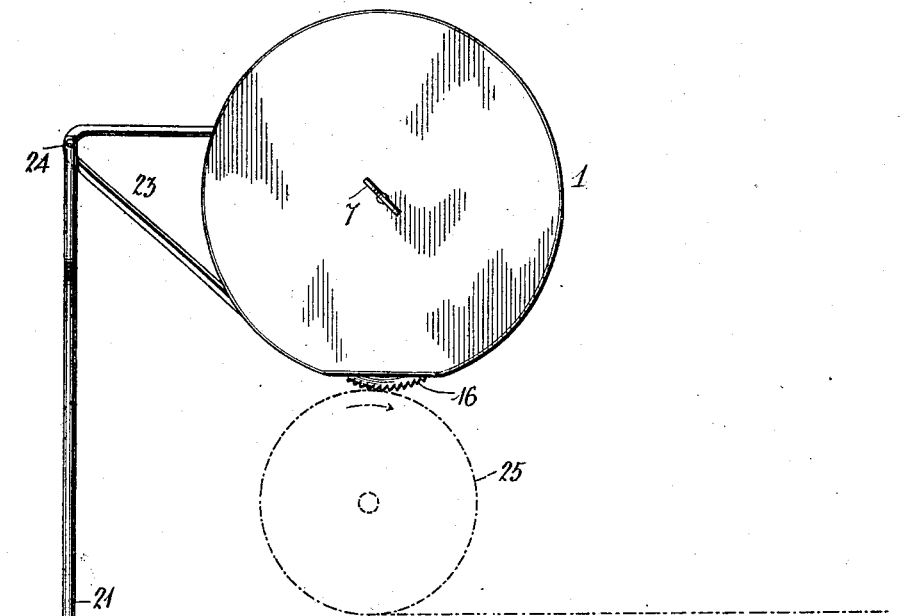
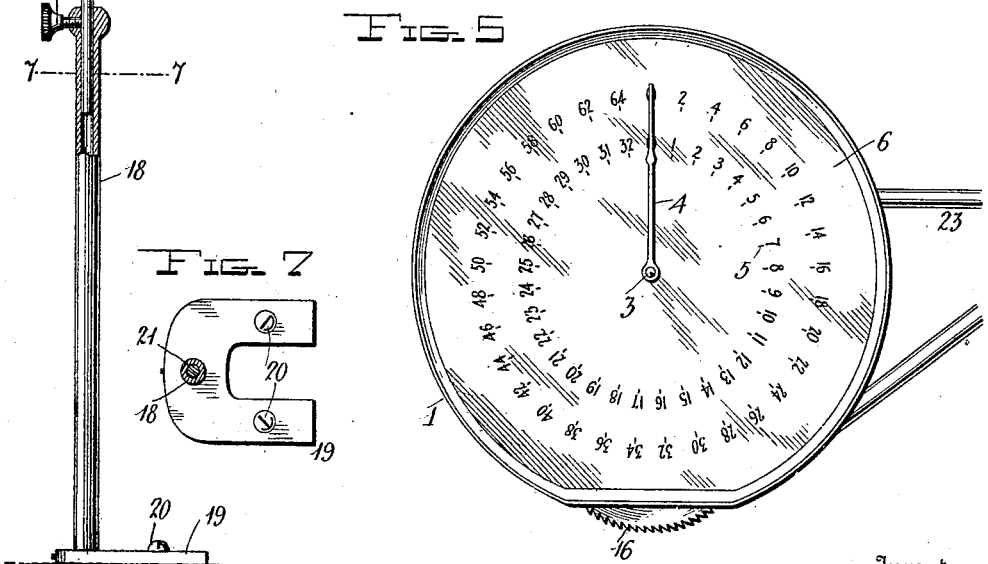
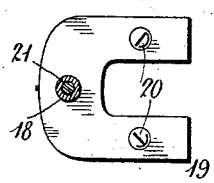
Inventor
Charles E. Schindler
By Victor J. Evans
Attorney
Witnesses

UNITED STATES PATENT OFFICE.

CHARLES E. SCHINDLER, OF COLDWATER, OHIO.

BORDER-CALCULATOR.

No. 904,456.

Specification of Letters Patent.

Patented Nov. 17, 1908.

Application filed September 4, 1907. Serial No. 391,362.

*To all whom it may concern:*

Be it known that I, CHARLES E. SCHINDLER, a citizen of the United States, residing at Coldwater, in the county of Mercer and State of Ohio, have invented new and useful Improvements in Border-Calculators, of which the following is a specification.

This invention relates to measuring and calculating machines; and it has particular reference to machines for measuring borders for wall paper and for calculating the amount required which may then be cut off accurately without wastage.

The invention has for its object to provide a machine of this class which shall possess superior advantages in point of simplicity, durability, ease of operation and general efficiency; and which may be advantageously used in connection with an ordinary paper trimming machine of approved construction.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention; it being, however, understood that no limitation is necessarily made to the precise structural details therein exhibited, but that changes, alterations and modifications within the scope of the claims may be resorted to when desired.

Figure 1:
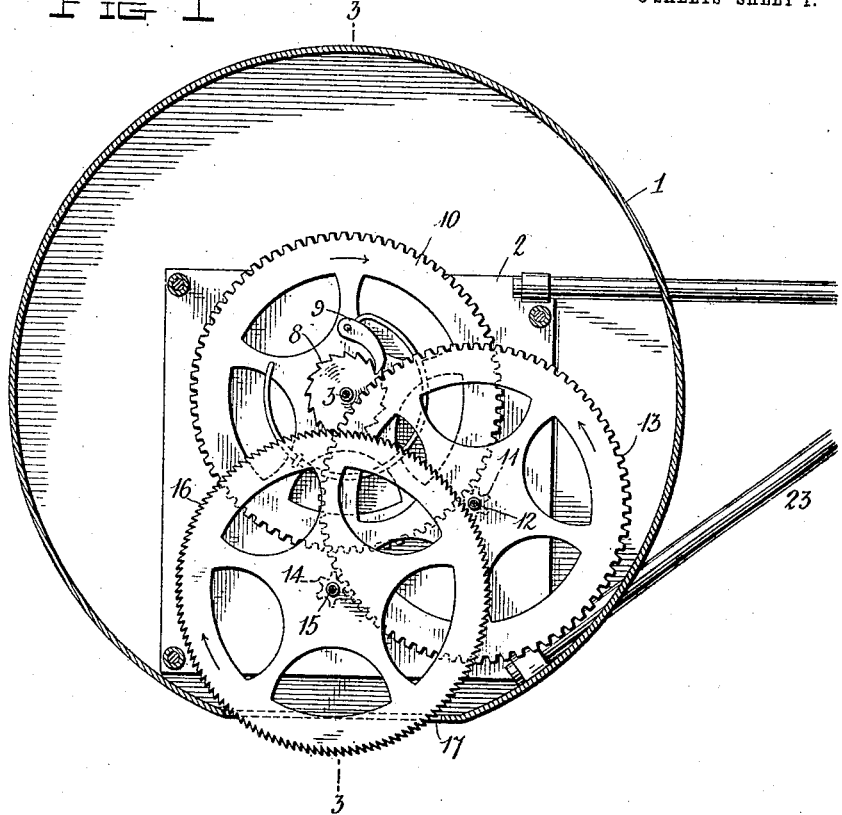
Figure 2:
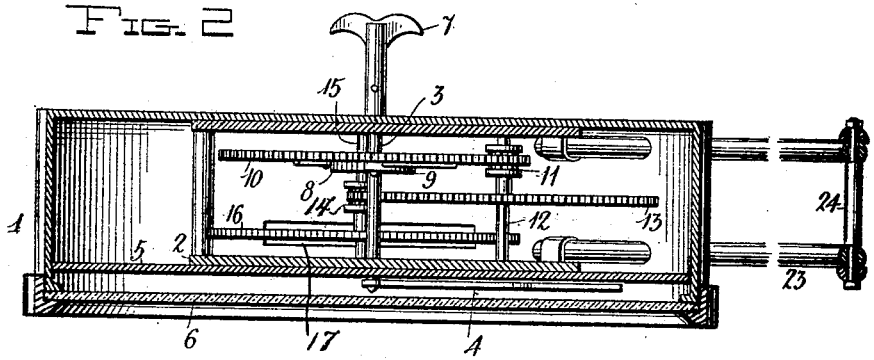
Figure 3:
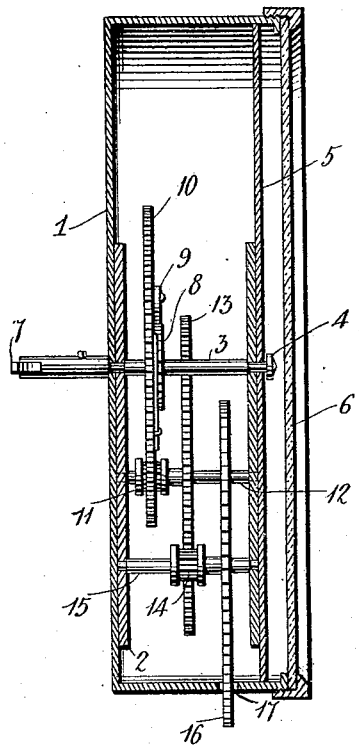
Figure 4:
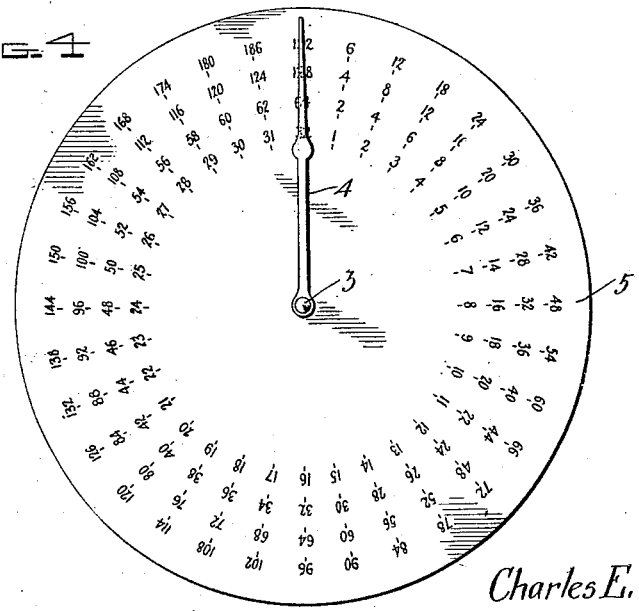

In the drawings, Figure 1 is a vertical sectional view taken through the casing of the improved measuring machine showing the internal gearing in elevation. Fig. 2 is a horizontal sectional view. Fig. 3 is a vertical section through the casing taken on the plane indicated by the line 3—3 in Fig. 1, the gearing appearing in elevation. Fig. 4 is a front view of the dial. Fig. 5 is a front view of the casing of the apparatus showing a dial slightly modified. Fig. 6 is a side elevation showing the apparatus mounted in position for operation. Fig. 7 is a horizontal sectional view taken through the supporting standard on the line 7—7 of Fig. 6.

Corresponding parts in the several figures are denoted by like characters of reference.

A suitable casing 1 which may be approximately cylindrical or of any other suitable shape contains a frame 2 provided with bearings for a main shaft or arbor 3 carrying a hand or pointer 4 which moves over a dial 5, suitably secured upon the frame and visible through a glass or other transparent front closure 6 of the casing. The arbor 3 carries a handle 7 whereby it may be rotated, and it has a ratchet wheel 8 engaged by a spring actuated pawl 9 pivoted upon the face of a gear wheel 10 which is loosely mounted for rotation upon the arbor 3. The gear wheel 10 meshes with a pinion 11 upon a countershaft 12 carrying a spur wheel 13 meshing with a pinion 14 upon an operating shaft 15; the latter carrying also a ratchet toothed operating wheel 16 a portion of which projects through a slot 17 in the bottom of the casing.

The operating wheel 16 is of known and predetermined diameter, and its movement is indicated by the hand 4 moving over the dial 5 which latter is provided with concentric rows of figures, one of which, preferably the inner one, indicates in feet, yards or any other predetermined unit of measurement the distance traversed by a given point in the periphery of the operating wheel or measuring wheel 16 during the rotation of the latter. Thus, in the preferred form of the apparatus, the Figs. 1, 2, 3, &c., in the inner series of figures, will indicate the number of yards of material passing beneath and in contact with the periphery of the measuring wheel, and operating to rotate the latter; the train of speed reducing gearing and the placing of the figures being obviously calculated accurately with reference to the known circumference of the measuring wheel.

The apparatus, as hereinbefore stated, is constructed with special reference to measuring borders for wall paper. These borders are usually manufactured as what is known to the trade as one band, two band, four band and six band borders, these expressions being used to indicate that one, two, four or six border patterns, duplicates of the same pattern, are printed in parallel relation upon the strip or sheet. The outer concentric rows of figures upon the dial are therefore, simply multiples of the figures in the inner row by two, four and six, respectively; and it thus becomes possible at a glance to read off the total number of yards or other units of measure of border that have been reeled off beneath the machine and in contact with the measuring wheel, when the machine is mounted for operation.

The manner of mounting the machine will be readily understood by reference to Fig. 6 of the drawings. An upright or standard 18 is provided with a foot 19 which may be secured in position for operation by means of screws or other fastening members 20 passing therethrough. The standard 18 is tubular in shape, and it carries an extension rod 21 adapted to be secured in position adjustably by means of a set screw 22. Securely connected with the frame 2 of the machine, and extending through the casing 1 is a bracket 23 which is connected pivotally by means of a pin 24 with the upper end of the extension rod 21. The supporting standard is mounted in a suitable position to enable the casing of the machine to rest upon or in contact with a roll 25 on which the material to be measured is being wound; the projecting portion of the measuring wheel being held in frictional engagement with the material that is being wound upon the roll by the weight of the apparatus which is pivotally supported in the manner described, and which gravitates in the direction of the receiving roll. It is obvious that as material is being wound upon the latter it serves to rotate the measuring wheel, the sharp pointed ratchet teeth of which are faced against the direction of rotation so as to prevent slipping of the material and consequent passing of the material beneath the measuring wheel without rotating the latter. The position of the hand upon the dial will at all times indicate the precise quantity of material that has passed beneath the measuring wheel, and also the total length of border pattern of any of the various widths that are customarily employed.

After the desired quantity of material has been measured, the hand may be restored to zero by simply turning it forward by means of the handle 7 upon the arbor 3; the ratchet wheel 8 slipping idly beneath the pawl 9 connected with the spur gear 10.

It is obvious that within the scope of the invention the apparatus may be mounted in such a manner as to measure the material taken from a roll instead of that which is being wound upon a receiving roll.

Having thus fully described the invention, what is claimed as new is:—

1. An apparatus for measuring single or multiple wall-paper border-strips in the operation of winding or unwinding the same upon or from a roll, the said apparatus comprising a supporting standard, a frame or casing provided with a stationary dial having concentric rows or series of numerals, one for measuring the length on single strips and the other for measuring the aggregate length on multiple strips, the last named series of numerals being multiples of the numerals of the first series, means pivotally connecting said casing with the standard, a hand or pointer mounted for movement around said dial for coöperation with both series of numerals, a toothed operating wheel projecting exteriorly through the bottom of the casing for contact with the strip winding upon or unwinding from the roll and held thereon by the weight of the casing and contained parts, said casing being free for up and down movement through its pivotal connection with the standard to compensate for the varying diameter of the material upon the roll, and gearing within the casing for transmitting movement from said operating wheel to the hand or pointer.

2. An apparatus for measuring single or multiple wall-paper border-strips comprising a supporting standard adjustable as to length, a casing having a rigid arm extending therefrom and pivotally connected with the standard and provided with a stationary dial having concentric rows or series of numerals disposed in corresponding relation for measuring the length of a single strip or the aggregate length of a multiple strip, a hand or pointer mounted upon the casing to sweep over said dial and coöperate with the several series of numerals, a toothed operating wheel projecting from the casing and adapted to engage the surface of a strip being wound upon or unwound from an underlying roll and held in contact therewith by the weight of the casing, which, through its pivotal support, is free for vertical movement to compensate for variations in the diameter of the roll, and gearing within the casing and operated by said wheel for transmitting motion to the pointer.

3. An apparatus for measuring single or multiple wall-paper border strips in the operation of winding or unwinding the same upon or from a roll, the said apparatus comprising a vertically adjustable support, a frame or casing having an arm pivotally connected with said support and provided with a stationary dial, said dial having concentric rows or series of numerals, one constituting multiples of the other, a shaft or arbor mounted in said frame or casing and carrying a hand or pointer movable around the dial for cooperation with both series of numerals, a toothed operating wheel projecting exteriorly through the bottom of the casing for contact with moving strip, a train of gearing for communicating motion from said measuring wheel to said shaft or arbor, said frame including a gear loose on said shaft and a pawl and ratchet connection between the gear and shaft, said pawl and ratchet mechanism permitting retrograde motion of the ratchet wheel without operating the pointer, and a hand piece on said shaft whereby the latter may be turned independently of the gearing for setting the pointer back to zero position, substantially as specified.

In testimony whereof I affix my signature in presence of two witnesses.

CHARLES E. SCHINDLER.

Witnesses:
J. V. M. BETTINGER,
CHARLES P. GARDNER.